April 3, 1934. C. H. SHOFF 1,953,692
METHOD OF MAKING A FISH BAIT AND THE PRODUCT THEREOF
Filed Nov. 24, 1930
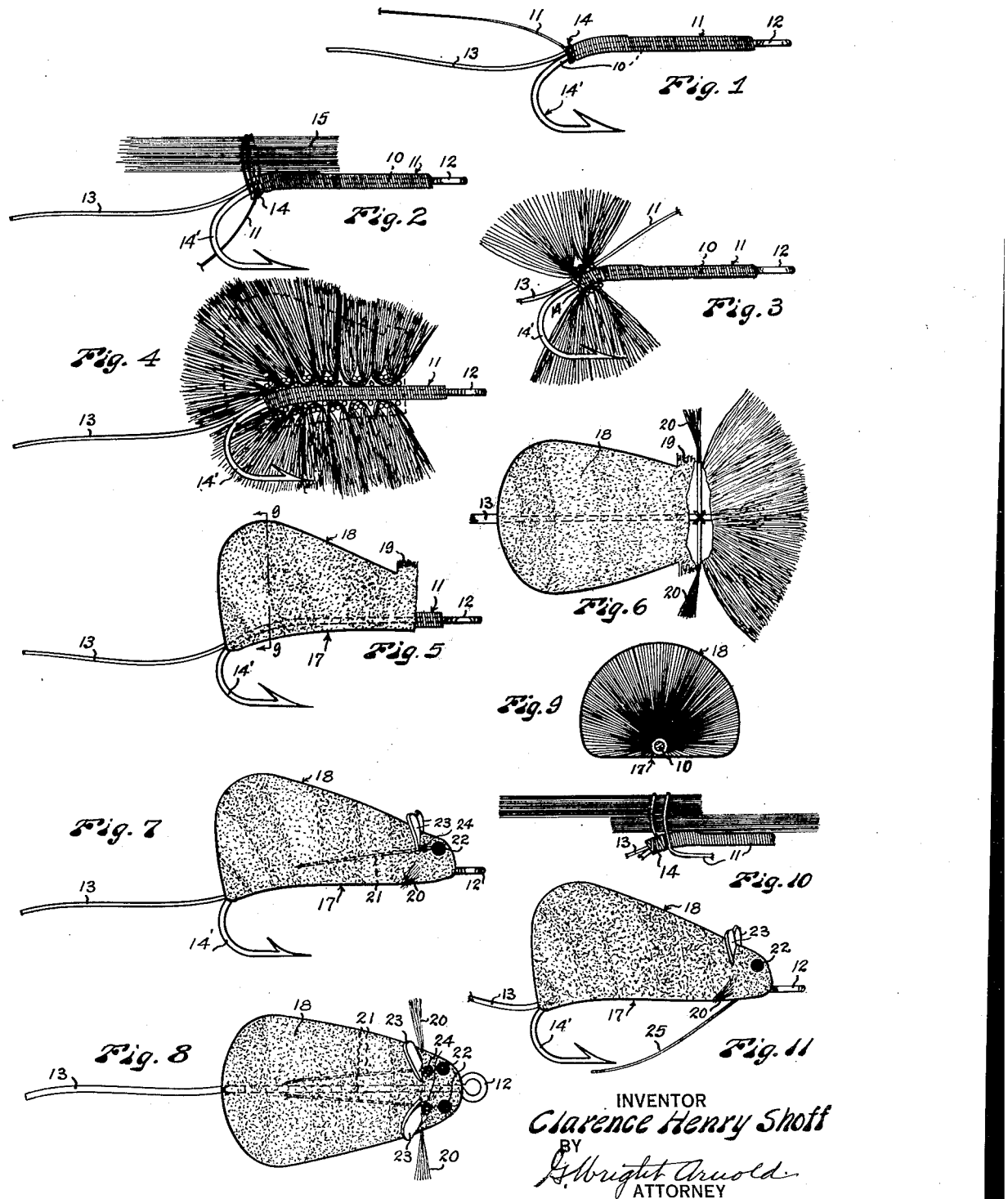
INVENTOR
Clarence Henry Shoff
BY
ATTORNEY Patented Apr. 3, 1934

1,953,692

UNITED STATES PATENT OFFICE 1,953,692

METHOD OF MAKING A FISH BAIT AND THE PRODUCT THEREOF

Clarence Henry Shoff, Kent, Wash.

Application November 24, 1930, Serial No. 497,808

6 Claims. (Cl. 43—48)

My invention relates to the method of making a fish bait and the product thereof. More particularly, my invention relates to the method of making an artificial mouse, or similar animal, adapted for use as a bait, and the product thereof.

It is well known that the proper bait to be used in catching fish is one assimilating the natural food of the fish and considerable effort has been extended toward assimilating minnows, flies, bugs and other animal life found about the fishing ground. However, as game fish are being depleted, they are becoming more wary and wise and a successful fisherman must understand the habits of the fish and must have a more perfect bait than ever before, or he will be relegated to the unsuccessful class.

Around lakes and streams and salt water, it is generally known that trout, bass, muskellunges, pike, pickerel, and many other fish feed on young mice, muskrats, water rats and similar animals. Realizing the bait should assimilate the natural food, some attempt has been made to assimilate a mouse or similar animals, but no method has been heretofore devised, whereby an artificial mouse could be constructed so that (1) a truly realistic appearance is obtained, (2) a durable product capable of withstanding the chewing and biting of the fish as it strikes, and the struggle of the fish in its attempted run for freedom, (3) a product without a cork core or other center which would become exposed after use, (4) a bait which is of the proper weight and balance to be easily and successfully cast and to always land on the water in an upright position, and (5) a bait which will not watersoak.

I have devised a method of producing an artificial mouse and similar animals, the product of this method being a bait which overcomes the difficulties heretofore found in the art.

The above mentioned general objects of my invention, together with others inherent in the same, are attained by the process, illustrated in the following drawings, the same being preferred exemplary forms of embodiment of my invention, throughout which drawing like reference numerals indicate like parts:

Figure 1 is a view in elevation of a hook, wrapped with thread and having a strip of leather for a tail attached thereto;

Fig. 2 is a view in elevation showing the manner in which the first bunch of hairs is applied, preparatory to securing it to the hook;

Fig. 3 is a view in elevation, showing the hair and securing knots in cross section, and the first bunch of hair secured to the hook;

Fig. 4 is a view in elevation showing the hair and securing knots in cross section, with all the body hair secured to the hook;

Fig. 5 is a view in elevation of my invention, showing the body trimmed out of the secured hairs shown in Fig. 4;

Fig. 6 is a plan view of my invention, with parts broken away, showing the whiskers and the hair from which the head is composed, attached, the whiskers being shown somewhat diagrammatically in the broken away part so that they may be distinguished from the hair to be used for the head;

Fig. 7 is a view in elevation of my invention, showing the finished product;

Fig. 8 is a plan view of Fig. 7;

Fig. 9 is a cross section substantially on line 9—9 of Fig. 5;

Fig. 10 is a plan view showing my method of "hair-splicing" to be used where the hair is short or a large mouse is desired; and Fig. 11 is a side elevation showing an alternative construction with the guard runners attached to prevent snagging of the point of the hook.

In the first instance, the hair is removed from the pelt of the animal and placed in rows before the operator. Reindeer pelt is preferably used because the hair in color and general appearance, closely assimilates the hair of a mouse, because the hair, when wet, does not droop and sag and because both ends of the hairs when tied, tend to protrude at a ninety degree angle from the shank of the hook.

A fish hook of the proper size is placed in a vise with the shank 10 unobstructed and is securely held in position to enable the operator to conveniently work. The size of the hook to be used depends upon the size of the mouse that is to be made. The mouse when completed, not including the length of the tail, will be as long as the extreme vertical length of the shank of the hook. The size of the hook proper, that is, as distinguished from the shank, will be easily determined by those skilled in the art. A smaller mouse is used as bait for smaller fish which have a smaller mouth, and a larger mouse is used for bait for larger fish. The larger fish are able to span a larger hook and a larger hook is necessary for strength to land a larger fish.

The shank 10 of the hook may be then wrapped, preferably because of the strength of such thread, with a layer of waxed linen thread 11. I have found that the wax generally used for covering stitching, is the most preferable. The operator commences to wrap at the eye end 12 of the shank, wrapping over and covering the first end of the thread. The wrapping continues to a place on the shank approximating three-quarters of its length. By reason of such wrapping, the hair will not slide on the shaft and the wrapping will form a foundation, so that various bunches of hair are held secure. Next, a small strip of dark kid leather 13, or any material tending to assimilate the tail of a real mouse, may be placed next to the shank of the hook and parallel thereto, and pointing away from the front of the shank. This material is flexible so that it will give the realistic appearance of the tail of a live mouse, as it moves, due to the action of the water. The wrapping is continued to secure one end of the leather 13 to the shank of the hook, and half hitches 14 are then used to permanently secure the leather 13. The wrapping has been now continued from the eye 12 of the hook for the full length of the shank 10 to a position slightly around the curve 14' of the hook, and the tail is secured by the wrappings.

Then the operator places a bunch of hair 15 with the hairs parallel to the shank and the centers directly over the free end of the thread. Before the hair is used it is advisable to comb the hair with an ordinary comb. This will eliminate short hairs and will remove the wool found in the hair. This wool is found in the hair in varied quantities depending upon the time the animal is killed. It is undesirable because of its appearance in the finished mouse and because it is not readily cut, by clippers, in trimming the mouse. The hairs 15 are held loosely by the operator and as the thread 11 is pulled preferably twice around the hair, such pulling will disperse the hairs evenly around the shank 10, then a half hitch is taken in the thread 11 to secure the hairs 15 in this position, see Fig. 3. In the event that the hairs 15 are not substantially positioned uniformly about the shank 10, the operator may properly position the hair. However, this latter positioning is seldom required. The hairs 15, being tied in a bunch and secured in the centers, the ends of the hairs will point at an angle approaching ninety degrees to the shank of the hook, see Fig. 3. The hairs of the reindeer or animal used, generally are of lighter color next to the hide than on the outer end thereof. So, if each bunch is put on with the hairs pointing in the same direction, the mouse, when completed, will have a striped appearance closely assimilating a real mouse. Successive bunches of hair are similarly secured closely adjacent to each other, approximating six to ten in number, depending on the size of the mouse, until the position on the mouse is reached where its whiskers would naturally protrude. See Fig. 4.

Then, ordinary electric hair clippers are used, and the under side 17 of the mouse is clipped away. The clipping is done close to the wrappings, see dotted lines in Fig. 4. Some of the hairs within the curve 14' of the hook, must be clipped by hand when an ordinary clipper is used.

The back 18 of the mouse is then similarly clipped and shaped to the proper dimensions. All of the trimming is done, except a small bunch 19, on the nape of the neck, which is only slightly trimmed, see Fig. 5, and which trimming is completed with the head trimming.

The whiskers 20 are then inserted and tied to the hook. Seven or eight hairs of a goura, or pheasant, are preferably used because of the color and appearance, the softness and the tendency of this hair to separate when tied to the hook and not stay in bunches. Another bunch of hair is tied to the shank 10 and then trimmed to give the appearance of the head of the mouse. This trimming is preferably done by hand so that the whiskers 20 are left protruding and not trimmed off in shaping the head portion.

Then pins 21, with black heads 22, of the proper size to assimilate the eyes of a mouse, are stuck through small leather tabs 23, of the proper size to assimilate the ears of a mouse. The shanks of the pins 21 are then coated with a film of waterproof glue or lacquer. The pins are then inserted into the body of the mouse, see Fig. 7, with the shanks of the pins 21 under the knots of thread 11, and the "eyes" and "ears" protruding in their respective places to assimilate a natural mouse, the ears being slightly behind the eyes. Then drops of glue or lacquer are placed substantially at points 24, which are as near as possible the base of the ears, which now are embedded in the hair, and another drop on the shank 21 of the pin, just behind the head 22. As a slight amount of the glue will probably show, it is desirable to dust the head of the mouse with a powder made of ground, powdered hair. The bottom portion 17 of the animal, adjacent to the wrappings, is covered with glue or lacquer to procure a longer life and prevent rotting.

In securing the hairs as hereinbefore described, it is advisable to use the ones of shorter length at either end of the mouse as most of these are clipped away, thereby eliminating waste. In the event that a large mouse is to be made, or if the hair is not of sufficient length so that both ends will reach the desired height, the bunches of hair applied at one time may be effectively spliced. This is done by placing one-half of the bunch of hair so that the thread 11 will encircle it at a position about one-fourth, depending upon the length of the hair, of the distance between the extremities of the length of the hair with the long ends in one direction and the other half of the bunch so that it will likewise be encircled at a position about one-fourth of the distance between the extremities of the length of the hair, with the long ends of the hair in the opposite direction of the other half of the bunch. The hair is otherwise secured as before mentioned, see Fig. 10. This splicing may be only necessary through the center or heavy part of the body of the mouse.

In the event that dyeing is necessary to produce a mouse of the desired color, this is preferably done before the eyes and ears are attached.

The finished product is an artificial mouse that is very realistic. The mouse will float and is secured to fishing tackle from the eye 12 of the hook, which is black, and appears as a nose of the mouse. The hook portion 14' is below the water when in use and is the heaviest part, and the center of gravity of the mouse is very low, thereby tending to keep the mouse in an upright position. If the mouse is used in marshy and swampy places the hook may tend to foul or get caught in the weeds. To overcome this difficulty, guard means, see Fig. 11, in the nature of one or more flexible runners or guard members 25, are provided for the hook. I prefer to use two of the guard members 25. These guard members are both secured to the shank of the hook near the eye 12 and extend rearwardly and downwardly in divergent relation and the rear ends of these guard members are spaced apart and are positioned on opposite sides of the hook and are normally below the plane of the hook, whereby they will elevate the hook over any snag or obstruction without tilting the same sidewise. These runners are light, and as one end is free, they will not offer interference to the fish as it attempts to swallow the mouse. However, as the mouse is light and it floats, the runners will be sufficient to cause the mouse to ride over snags without engaging the hook portion 14'.

Obviously, changes may be made in the forms, dimensions and arrangement of the parts of my invention, without departing from the principle thereof, the above setting forth only preferred forms of embodiment.

I claim:

1. As an article of manufacture, a fish bait assimilating an animal, embodying animal hair, previously removed from the hide, positioned and secured substantially uniformly around the shank of a hook in a plurality of bunches, each bunch positioned in close proximity to another and the ends of said hair trimmed so that the periphery of said trimmed hair assimilates an animal; other hair secured to said hook assimilating whiskers, selectively disposed between bunches of said first hair; and small pieces of material assimilating ears provided with pins therethrough, said pins having beaded ends and shank portions, and said pins positioned with the shank end portions thereof under the wrappings securing the hair to the shank of said hook and the said beaded ends disposed in substantially the position of the eyes of the animal assimilated.

2. In the method of making a fish bait assimilating an animal, the steps of placing the animal hair, previously removed from the hide, in a bunch with the respective hairs parallel to the shank of a fish hook, positioning a binding material around said hairs and shank and disposing the hairs substantially uniformly around the shank by the friction between said binding material and said hairs as the binding material is tightened and secured to the hook.

3. In the method of making a fish bait assimilating an animal, the steps of placing animal hair, previously removed from the hide, in a bunch with the respective hairs parallel to the shank of a fish hook, positioning a binding material around said hairs and shank, disposing the hairs substantially uniformly around the shank by the friction between said binding material and said hairs as the binding material is tightened and secured to the hook, and disposing and securing other similar bunches of hairs in a similar manner, whereby the hairs project substantially vertical from the shank of the hook in all directions.

4. In the method of making a fish bait assimilating an animal, the steps of placing animal hair, previously removed from the hide, in a bunch with the respective hairs parallel to the shank of a fish hook, positioning a binding material around said hairs and shank, disposing the hairs substantially uniformly around the shank by the friction between said binding material and said hairs as the binding material is tightened and secured to the hook, disposing and securing other similar bunches of hairs in a similar manner, whereby the hairs project substantially vertical from the shank of the hook in all directions, and trimming the ends of said hairs so that the periphery of the end portion of said trimmed hairs assimilates the periphery of an animal.

5. As an article of manufacture, a fish bait assimilating an animal embodying a fish hook; clipped animal hair secured to said hook by means of a wrapping positioned intermediate the length of the hairs, and said hair being distributed substantially uniformly around the shank of the said hook in a bunch with the ends of the hairs projecting in all directions from said shank; and other bunches of hair, distributed and secured to said shank in a similar manner, positioned in close proximity to said first bunch of hair and to each other, and thereby forming a relatively compact mass in which the hairs rest against and support each other substantially radially from said hook, the ends of all of said bunches of hair being trimmed so that the periphery of said trimmed end portions assimilates the periphery of the animal assimilated.

6. The method of producing a fish bait assimilating an animal, which comprises securing clipped animal hair by means of a wrapping positioned intermediate the length of the hairs to a fish hook; distributing said hair substantially uniformly around the shank of the hook in a bunch with the ends of the hair projecting in all directions from the said shank; securing and distributing other bunches of hair to the shank of said hook in a similar manner, and positioning said other bunches in close proximity to each other, thereby forming a relatively compact mass in which the hairs rest and support each other substantially radially from said hook; and trimming the ends of all of said bunches of hair, so that the periphery of said trimmed end portions assimilates the periphery of the animal assimilated.

CLARENCE HENRY SHOFF.